United States Patent Office 2,987,086
Patented June 6, 1961

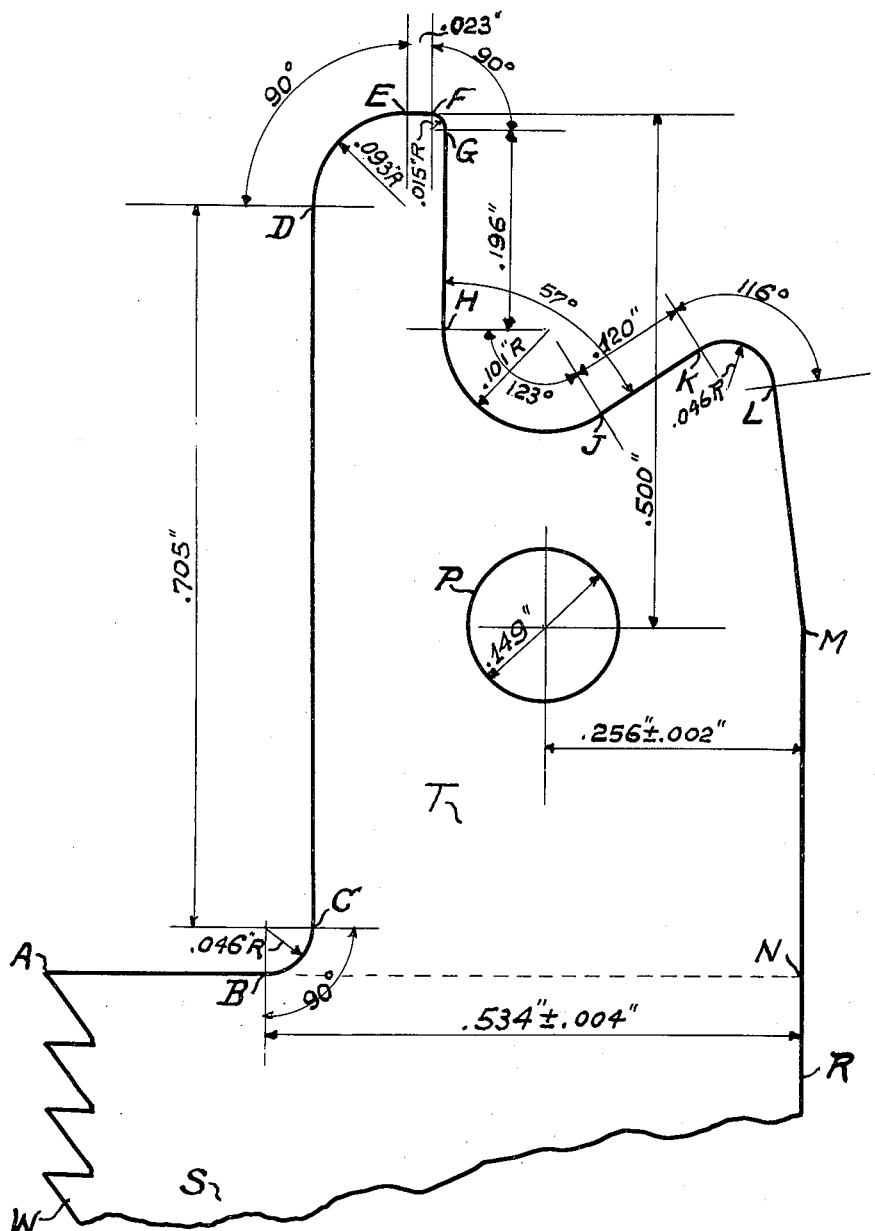

2,987,086
UNIVERSAL TANG FOR RECIPROCATING SAW BLADE
Raymond E. Westlund, Jr., Yowago Ave., Branford, Conn.
Substituted for abandoned application Ser. No. 859,223, Dec. 14, 1959. This application Oct. 4, 1960, Ser. No. 60,517
2 Claims. (Cl. 143—156)

My invention relates to saw blade tangs, and more particularly to a universal tang for reciprocating saw blades, being a substitute for my prior application Serial No. 859,223, filed on December 14, 1959.

In the plumbing, electric wiring, building, and several other trades many thousands of reciprocating power saws of various makes are in use. These power saws are either portable or stationary, operated by electric or pneumatic power, and vary greatly in design, but they all require renewable saw blades, connected to the operating mechanism by a tang. The shape of the tang of the saw blade also varies greatly in the various makes of power saws, so that generally each blade fits only the corresponding power saw and each power saw can use only the blade having the specific tang.

This situation makes the supplying of the replacement blades very difficult, particularly in rural areas where large stocks of the various blades are usually not available; it also renders many of the older models of power saws unusable if their manufacture is discontinued and the supply of the original blades has been exhausted.

The important object of my invention is to provide a universal tang for reciprocating saw blades which permits the application of the saw blade in the most generally used makes of power saws, insuring thereby the following advantages:

Will enable the supply stores to satisfy the demand for the replacement blades with a much smaller stock maintained than possible with the customary blades having tangs fitting only one particular make of power saw.

In many cases it will prevent stoppages in the work caused by the unavailability of saw blades with a particular shape of tang.

It will make possible the further use of discontinued types of power saws for which no original blades are available.

Other objects and advantages of my invention will be apparent during the course of the following description.

In the accompanying drawing, forming a part of this application, is shown a side elevational view of my universal tang for reciprocating saw blades, with the critical dimensions which constitute the fundamental feature of this invention.

Referring to the drawing, the letter S represents the saw blade, having a toothed working edge W, a back edge R, and a tang T. The tang herein shown is integral with the saw blade; the dotted line B—N representing only a theoretical demarcation between the blade and the tang. In alternative forms of my invention the blade and the tang may be made of separate pieces and joined together subsequently.

The novel feature of my invention, which produces the novel and very useful results, the universal applicability of the saw blades, consists of the particular outline or profile of my tang, shown in the drawing, which is a combination of accurately defined elements. The size and the location of each of these elements are critical, as the slightest deviation from these data renders the tang inoperative as a universal tang. Experience shows, that even a slight increase of the dimensions of this outline will make the insertion of the tang into the clamp of the power saw impossible and, on the other hand, even a slight reduction of the dimensions of this outline will result in a loose and unreliable clamping of the blade.

My universal tang, illustrated in the drawing, has an outline composed of the following elements:

Starting from the working edge W of the blade, the first element of the outline is the straight line A—B which begins at the tip of the first tooth A and extends at right angle to the working edge W to a point B, situated at a distance of .534", with plus minus .004" tolerance from the back edge R. The next element is a 90 degree arc B—C, with a radius of curvature of .046", adjoining the line A—B tangentially at B. Adjoining this arc B—C tangentially at C is a straight line C—D having a length of .705"; this line being tangential to the arc B—C and will be also perpendicular to the straight line A—B mentioned above. Adjoining tangentially the line C—D at the point D is a 90 degree arc D—E, having a radius of curvature of .093". Adjoining this arc tangentially at the point E is a straight line E—F, having a length of .120". This line E—F, due to its tangential position with respect to the arc D—E, is perpendicular to the line C—D mentioned above, and it represents the extreme edge of the tang. This line E—F is adjoined tangentially at the point F by a 90 degree arc F—G, having a radius of curvature of .015". Adjoining this arc F—G, at the point G, tangentially is a straight line G—H, having a length of .196" and being perpendicular to the line E—F. This line G—H is adjoined tangentially at the point H by a 123 degree arc H—J, having a radius of curvature of .101". Adjoining this arc tangentially at the point J is a straight line J—K, having a length of .120". This line J—K is adjoined tangentially at the point K by a 116 degree arc K—L, having a radius of curvature of .046". At the point L this arc K—L is adjoined tangentially by a straight line L—M, which is extended until it meets the extension of the back edge R of the blade at the point M. Finally the outline of the tang is completed by the straight line M—N forming the extension of the back edge of the blade R, parallel to the working edge W of the blade.

In the preferred form of my invention illustrated in the drawing the back edge R is parallel to the working edge W of the blade. In alternative forms of my invention the shape of the back edge R may vary, provided the distance between the point B and N is the same as shown in the drawing and the straight line M—N is parallel to the working edge W of the blade.

The preferred form of my invention illustrated in the drawing has also an additional feature, consisting of a circular hole P, having a diameter of .149" and having the position of its center defined by the following coordinates: .256" with plus minus .002" tolerance, measured perpendicularly from the line M—N and .500" from the line E—F, measured parallel to the working edge W of the blade. The purpose of this hole is merely to increase the strength and the safety of the clamping of the blade by the use of a stud or pin through the hole whenever the construction of the clamping device of the power saw permits this. In alternative forms of my invention this hole P may be entirely omitted without departing from the spirit of my invention because the universality of my tang is due exclusively to the particular outline of the tang, described above.

In the above description the sign " denotes the inch as the unit used for measuring lengths and distances. The arcs mentioned are circular and the degrees correspond to $\frac{1}{360}$ of a circle. The term tangentially means that at the junction of a straight line and an arc the straight line is perpendicular to the radius of the arc.

I claim:
1. In connection with a reciprocating saw blade hav- ing a toothed working edge and a back edge, a tang having the outline composed of the following elements: beginning at the tip of the first tooth of said working edge, a straight line disposed at right angle to said working edge and extended to a point situated at a distance of .534", with plus minus .004" tolerance, from said back edge; adjoining this tangentially a 90 degree arc having a radius of curvature of .046"; adjoining this tangentially a straight line having a length of .705"; adjoining this tangentially a 90 degree arc having a radius of curvature of .093"; adjoining this tangentially a straight line having the length of .023", and forming the extreme edge of the tang; adjoining this tangentially a 90 degree arc having the radius of curvature of .015"; adjoining this tangentially a straight line having the length of .196"; adjoining this tangentially a 123 degree arc having a radius of curvature of .101"; adjoining this tangentially a straight line having a length of .120"; adjoining this tangentially a 116 degree arc having a radius of curvature of .046"; adjoining this tangentially a straight line extended to meet the extension of said back edge of the blade; adjoining this the extension of said back edge; said tang is provided with a circular hole of .149" diameter and having the position of its center defined by the following coordinates: .256", plus minus .002", measured from said extension of the back edge and .500" from said extreme edge of the tang, measured parallel to said workng edge of the blade.

2. In connection with a reciprocating saw blade having a toothed working edge and a back edge, a tang having the outline composed of the following elements: beginning at the tip of the first tooth of said working edge, a straight line disposed at right angle to said working edge and extended to a point situated at a distance of .534", with plus minus .004" tolerance, from said back edge; adjoining this tangentially a 90 degree arc, having a radius of curvature of .046"; adjoining this tangentially a straight line having a length of .705"; adjoining this tangentially a 90 degree arc having a radius of curvature of .093"; adjoining this tangentially a straight line having the length of .023" and forming the extreme edge of the tang; adjoining this tangentially a 90 degree arc having the radius of curvature of .015"; adjoining this tangentially a straight line having the length of .196"; adjoining this tangentially a 123 degree arc having a radius of curvature of .101"; adjoining this tangentially a straight line having a length of .120"; adjoining this tangentially a 116 degree arc having a radius of curvature of .046"; adjoining this tangentially a straight line extended to meet the extension of said back edge of the blade; adjoining this the extension of said back edge of the blade completing the outline of said tang.

References Cited in the file of this patent
UNITED STATES PATENTS

| | | |
|---|---|---|
| 2,735,458 | Buchmann | Feb. 21, 1956 |
| 2,783,792 | Keesling | Mar. 5, 1957 |
| 2,890,728 | Craven | June 16, 1959 |